United States Patent [19]

Burkin et al.

[11] 3,858,724

[45] Jan. 7, 1975

[54] METHOD OF CHECKING ELECTRIC PARAMETERS OF FERRITE CORES OF MEMORY STACK

[76] Inventors: Jury Alexandrovich Burkin, Tsvetnoi proezd 29, kv. 24; Jury Emelyanovich Seleznev, Vesenny proezd 4a, kv. 16, both of Novosibirsk, U.S.S.R.

[22] Filed: Nov. 14, 1973

[21] Appl. No.: 415,904

[30] Foreign Application Priority Data

Dec. 11, 1972 U.S.S.R. .......... 1858159

[52] U.S. Cl. .......... 209/72, 209/81 A, 324/34 MC

[51] Int. Cl. .......... B07c

[58] Field of Search .......... 324/34 R, 34 MC; 209/81, 209/81 A, 73, 72

[56] References Cited

UNITED STATES PATENTS

| | | | |
|---|---|---|---|
| 3,249,926 | 5/1966 | Ashley | 324/34 MC |
| 3,403,330 | 9/1968 | Kastning | 324/34 MC |
| 3,492,662 | 1/1970 | Whitson et al. | 324/34 MC |
| 3,532,970 | 10/1970 | Gogos | 324/34 MC |
| 3,714,556 | 1/1973 | Risky | 324/34 R |

*Primary Examiner*—Allen N. Knowles
*Attorney, Agent, or Firm*—Holman & Stern

[57] ABSTRACT

A method of checking electric parameters of ferrite cores of a memory stack, string by string. The method involves the step of sending test pulses through Y coordinate wires, reading out pilot remagnetization signals of the cores from the X coordinate wire and removing defective cores. Each string of ferrite cores being checked, which is threaded with Y and X coordinate wires, is placed in a thermostatic chamber where the electric parameters of the ferrite cores in the string are checked at a temperature changed according to a preset program and at a preset constant temperature. The method imposes stringent conditions on the checking of electrical parameters of ferrite cores, which improves the quality and accuracy of checking and eliminates errors in sorting out memory matrices.

2 Claims, No Drawings

METHOD OF CHECKING ELECTRIC PARAMETERS OF FERRITE CORES OF MEMORY STACK

BACKGROUND OF THE INVENTION

The present invention relates to methods of manufacturing ferrite-core stores for electronic computers, and more particularly to a method of checking the electric parameters of ferrite cores of a memory stack.

The invention is applicable to checking processes in the course of manufacturing matrices of a memory stack with any topological circuits and with ferrite cores of various size, including subminiature.

A method of checking and rectifying defects of a memory stack, is known in the art consisting of threading ferrite cores with coordinate wires, which is carried out simultaneously with transmitting test pulses and reading out pilot signals from each ferrite core of a threaded string. The above method demonstrates techniques for removing defective ferrite cores.

The known method includes the following operations: in the course of threading a matrix or a memory stack, test current pulses are applied in consecutive order, via a switch, to wires arranged in the Y coordinate direction of the axis having ferrite cores to be threaded strung there on. One string of ferrite cores is threaded with the X coordinate wire, after which the X coordinate wires read out pilot remagnetization signals of the ferrite cores with the aid which is part of a reading amplifier of the checking device. In case a defective ferrite core is detected, the string threaded with the X coordinate wires is undone and the defective ferrite core is broken, whereby it is removed from the Y coordinate wire. It is then replaced by another ferrite core from these strung on the Y coordinate wire. After that, the string of ferrite cores, with the defective ferrite core having been replaced, is again threaded by the X coordinate wire and checked. If no defective ferrite cores are found, threading of the next string of the matrix is commenced.

A disadvantage of the above method resides in that ferrite cores are checked at ambient temperature which differs from the temperature at which a memory stack actually operates. This accounts for inaccuracies in checking ferrite cores and a manufactured memory stack of inferior quality.

At present, the manufacture of matrices and memory stacks is in many cases a manual process. Electrical parameters of ferrite cores in this case are checked only after threading of a matrix with Y and X coordinate wires has been completed. Operation of a memory stack in this case is checked in a pressure chamber, provided that the matrices have been finished and threaded with digit windings, the latter being soldered to terminals of the matrices.

This method of checking ferrite cores of a memory stack also displays a disadvantage which resides in the complicated manner of removing defective ferrite cores and the low quality of a repaired matrix. In case a defective ferrite core is found in a finished matrix, Y and X coordinate wires corresponding to the defective ferrite core are removed, which entails the cutting of the read winding and the inhibit winding at the place where the defective ferrite core is located. The defective ferrite core is removed and replaced by another core which is again threaded with Y and X coordinate wires; the inhibit and read wires are connected and soldered thereto.

SUMMARY OF THE INVENTION

It is an object of the present invention to provide a method of checking electrical parameters of ferrite cores, which eliminate errors in sorting matrices and memory stacks.

The invention essentially resides in that in a method of checking electrical parameters of ferrite cores of a memory stack, carried out string by string, whereby the threading of ferrite cores with Y and X coordinate wires is accompanied by transmitting test pulses through the Y coordinate wires, reading out pilot remagnetization signals of the cores from the X coordinate wire and removing defective ferrite cores, each string of ferrite cores being tested, which is threaded with Y and X coordinate wires, is placed, in accordance with the invention, into a thermostatic chamber, where electrical parameters of the ferrite cores in each string are checked at a temperature which is varied according to a preset program.

This object is attained by providing a method of checking electrical parameters of ferrite cores of a memory stack, carried out string by string, whereby the threading of ferrite cores with Y and X coordinate wires is accompanied by transmitting test pulses through the Y coordinate wires, reading out pilot remagnetization signals of the cores from the X coordinate wire and removing defective ferrite cores, in which method each string of ferrite cores being checked, which is threaded with Y and X coordinate wires, is placed, in accordance with the present invention, into a thermostatic chamber, where electrical parameters of ferrite cores in each string are checked at a temperature which varies according to a predetermined program.

It is expedient that each threaded string of ferrite cores placed in a thermostatic chamber be checked at a preset constant temperature.

Checking electrical parameters of ferrite cores in accordance with the method of the invention makes for more stringent checking conditions, which increases the accuracy and quality of checking and eliminated errors in sorting out memory matrices. The method simplifies the manufacture of matrices and memory stacks and raises the finished quality thereof.

DETAILED DESCRIPTION OF PREFERRED EMBODIMENTS

The invention will hereinafter be explained in greater detail with reference to a preferred embodiment thereof.

The operation of applying test pulses and reading out remagnetization signals of each ferrite core may be performed by any known checking instrument, for example, a computer for checking ferrite cores. It is feasible, with the aid of the latter, to plot remagnetization characteristics of each ferrite core and to carry out statistical processing thereof in order to obtain characteristics of a given batch. The results of the statistical processing are used to introduce necessary adjustments into the technological process. The system's output amounts to 400 ferrite cores per minute.

Test current pulses are applied, with the aid of a computer, to the Y coordinate wires having ferrite cores strung thereon.

One ferrite core out of these strung on each Y coordinate wire is threaded with the X coordinate wire. The threaded string of ferrite cores is placed in a thermostatic chamber and connected to the checking device, which is followed by reading out pilot signals of all the ferrite cores. The analysis of the quality of these cores is carried out at a preset constant temperature or at a temperature which changes from a preset minimum to a preset maximum value.

In case a defective ferrite core is detected, the threaded string is undone, and the defective ferrite core is broken and removed from the Y coordinate wire. The defective ferrite core thus removed is replaced by the succeeding core strung on the Y coordinate wire. After that, the ferrite core string is again threaded with the X coordinate wire and checked. If no flaws are traced, the threading of the next string of the matrix is initiated.

The method for checking electrical parameters of ferrite cores of a memory stack according to the present invention increases the quality of matrices and memory stacks, speeds the manufacturing process and cuts down production costs.

What is claimed is:

1. A method for checking electrical parameters of ferrite cores of a memory stack comprising the steps of: threading ferrite cores with Y and X coordinate wires to form strings of the ferrite cores; placing each string of the ferrite cores in a thermostatic chamber; transmitting test pulses through the Y coordinate wires; reading out pilot remagnetization signals of the ferrite cores from the X coordinate wire; checking electrical parameters of the ferrite cores in the string at a temperature varied in accordance with a preset program to determine the existence of defective cores thereon; and removing defective ferrite cores so determined.

2. A method as claimed in claim 1, consisting in that the threaded string of ferrite cores, placed in said thermostatic chamber, is checked at a preset constant temperature.

* * * * *